United States Patent
Chothave et al.

(10) Patent No.: US 10,927,850 B2
(45) Date of Patent: Feb. 23, 2021

(54) MOTOR MOUNT FOR HVAC SYSTEM

(71) Applicant: Johnson Controls Technology Company, Auburn Hills, MI (US)

(72) Inventors: Amit R. Chothave, Nashik (IN);
Piyush R. Adhav, Ahmednagar (IN);
Shashank B. Kadam, Pune (IN);
Praveen M. Gotakhindi, Pune (IN);
Anand Talikot, Belgaum (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 118 days.

(21) Appl. No.: 16/395,039

(22) Filed: Apr. 25, 2019

(65) Prior Publication Data

US 2020/0318655 A1   Oct. 8, 2020

Related U.S. Application Data

(60) Provisional application No. 62/831,047, filed on Apr. 8, 2019.

(51) Int. Cl.
*F04D 29/64* (2006.01)
*F24F 7/007* (2006.01)

(52) U.S. Cl.
CPC ........ *F04D 29/646* (2013.01); *F05D 2230/60* (2013.01); *F05D 2240/91* (2013.01); *F24F 7/007* (2013.01)

(58) Field of Classification Search
CPC .. F04D 29/626; F04D 29/646; F05D 2230/60; F05D 2240/91; F24F 7/007; F24F 2013/205

USPC .................................. 248/604, 674; 310/91
See application file for complete search history.

(56) References Cited

U.S. PATENT DOCUMENTS

| | | | | |
|---|---|---|---|---|
| 2,975,960 A | * | 3/1961 | Atalla | F04D 17/162 417/350 |
| 3,159,108 A | * | 12/1964 | Mullings | F04D 29/626 417/353 |
| 3,390,832 A | * | 7/1968 | Mullings | F04D 29/626 417/352 |
| 4,155,529 A | | 5/1979 | Maudlin | |
| 4,191,245 A | * | 3/1980 | Wendt | H02K 5/00 165/69 |
| 4,394,111 A | * | 7/1983 | Wiese | F24F 13/20 165/122 |
| 4,502,291 A | * | 3/1985 | Shelton | F25B 39/00 248/637 |
| 4,759,526 A | * | 7/1988 | Crawford | F16M 1/00 248/604 |
| 4,773,232 A | | 9/1988 | Lang et al. | |

(Continued)

FOREIGN PATENT DOCUMENTS

| | | |
|---|---|---|
| CN | 203537106 | 4/2014 |
| KR | 101697012 | 1/2017 |

*Primary Examiner* — Bradley Duckworth
(74) *Attorney, Agent, or Firm* — Fletcher Yoder, P.C.

(57) ABSTRACT

The present disclosure is directed to an adjustable mounting assembly for a fan motor, having a frame defining a space configured to receive the fan motor, a fixed nut coupled to the frame, and a bolt extending through the fixed nut and into the space. The frame is configured to mount to a heating, ventilation, and/or air conditioning (HVAC) unit, and the bolt is adjustable relative to the fixed nut to adjust a position of the fan motor within the space.

25 Claims, 9 Drawing Sheets

(56) References Cited

U.S. PATENT DOCUMENTS

| | | | | |
|---|---|---|---|---|
| 5,030,068 A | * | 7/1991 | Jacobs | F04D 29/668 |
| | | | | 417/363 |
| 5,492,456 A | * | 2/1996 | Knight | F04D 29/626 |
| | | | | 248/604 |
| 5,660,367 A | * | 8/1997 | Rush | F04D 29/601 |
| | | | | 248/302 |
| 6,158,978 A | | 12/2000 | Norbury, Jr. | |
| 7,038,342 B2 | * | 5/2006 | Icarre | H02K 5/00 |
| | | | | 248/637 |
| 8,736,124 B2 | * | 5/2014 | Jia | H02K 5/26 |
| | | | | 310/91 |
| 8,876,092 B2 | * | 11/2014 | Wojcieson | H02K 5/24 |
| | | | | 267/136 |
| 8,956,111 B2 | * | 2/2015 | Eddisford | F04D 29/542 |
| | | | | 415/190 |
| 9,746,003 B2 | * | 8/2017 | Frank | F04D 29/668 |
| 10,054,132 B2 | * | 8/2018 | Kinkel | F04D 29/4213 |
| 10,161,417 B2 | * | 12/2018 | Tejeda | F04D 25/06 |
| 10,174,768 B2 | * | 1/2019 | Shelton | F04D 29/626 |
| 2008/0087025 A1 | * | 4/2008 | McCain | F25D 23/006 |
| | | | | 62/3.7 |
| 2009/0211287 A1 | * | 8/2009 | Steele | B60H 1/3232 |
| | | | | 62/259.1 |
| 2019/0346195 A1 | * | 11/2019 | Troutman | F04D 29/541 |
| 2020/0224724 A1 | * | 7/2020 | Nalamwar | F16C 35/06 |

* cited by examiner

MOTOR MOUNT FOR HVAC SYSTEM

CROSS REFERENCE TO RELATED APPLICATIONS

This application claims priority from and the benefit of U.S. Provisional Application Ser. No. 62/831,047, entitled "MOTOR MOUNT FOR HVAC SYSTEM," filed Apr. 8, 2019, which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

HVAC systems are utilized in residential, commercial, and industrial environments to control environmental properties, such as temperature and humidity, for occupants of the respective environments. An HVAC system may control the environmental properties through control of an air flow delivered to the environment. For example, the HVAC system may circulate a refrigerant and place the refrigerant in a heat exchange relationship with a supply air flow to condition the supply air flow before it is discharged to the conditioned environment. The HVAC system may also place the refrigerant in a heat exchange relationship with an ambient air flow in order to facilitate cooling of the refrigerant. To this end, the HVAC system may include one or more fans configured to facilitate cooling of the refrigerant with the ambient air flow. Each fan may be operated by a fan motor, and each fan motor may be securely coupled within the HVAC system via a respective motor mount. In some embodiments, each motor mount may be configured to receive a particularly sized fan motor. As such, different embodiments of the motor mount may be manufactured to accommodate different sized fan motors, which may increase a cost associated with installation of fan motors in the HVAC system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an adjustable mounting assembly for a fan motor includes a frame defining a space configured to receive the fan motor, a fixed nut coupled to the frame, and a bolt extending through the fixed nut and into the space. The frame is configured to mount to a heating, ventilation, and/or air conditioning (HVAC) unit, and the bolt is adjustable relative to the fixed nut to adjust a position of the fan motor within the space.

In another embodiment, an adjustable mounting assembly for a fan motor includes a frame defining a space configured to receive the fan motor, a fixed nut coupled to the frame member and configured to support the fan motor, and a plate configured to couple to the frame member and extend into the space. A position of the plate relative to the frame member is adjustable Furthermore, the frame includes a frame member configured to couple to a heating, ventilation, and/or air conditioning (HVAC) unit.

In another embodiment, a heating, ventilation, and/or air conditioning (HVAC) unit includes a fan deck having a fan orifice with a boundary configured to encircle a fan, a frame including a plurality of frame members and a fixed nut coupled to each frame member of the plurality of frame members to define a space configured to receive a fan motor of the fan, and a bolt configured to extend through the fixed nut and into the space, wherein the bolt is configured to engage with the fan motor disposed in the space. Each frame member of the plurality of frame members is configured to couple to the fan deck.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system that includes one or more fans. In some embodiments, the one or more fans may draw or force air across a heat exchanger of the HVAC system, such as to cool a refrigerant flowing through the heat exchanger or an air flow directed across the heat exchanger. Each fan may be driven by a respective fan motor, and each fan motor may be secured to the HVAC system, such as to a fan deck or a housing of the HVAC system. The HVAC system may include motor mounts, and each motor mount may receive and secure a fan motor therein so as to secure the fan motor and corresponding fan to the HVAC system.

Different HVAC systems may utilize different fan motors that have various dimensions or sizes, such as different diameters and/or lengths. Unfortunately, traditional motor mounts may be configured to receive and support a fan motor having a particular dimension but may not support fan motors of other dimensions. As a result, different embodiments of motor mounts may be manufactured, and each motor mount embodiment may receive and support a different, respective fan motor embodiment. A particular fan motor may be installed in an HVAC system by using a corresponding motor mount of a particular configuration. As should be noted, manufacturing different embodiments of motor mounts may increase a cost associated with installing fan motors with an HVAC system. For example, if fan motors of a particular HVAC system are to be replaced with differently-sized fan motors, additional or different motor mounts may be manufactured and/or sourced in order to accommodate the differently-sized fan motors for installation within the HVAC system.

It is now recognized that implementing a motor mount that is configured to receive different embodiments of a fan motor may reduce costs associated with manufacture of HVAC systems. That is, a single embodiment of a motor mount may be configured to receive and support fan motors of different sizes. As a result, the single embodiment of the motor mount may be implemented into different HVAC systems. Accordingly, embodiments of the present disclosure are directed to a motor mount that is adjustable to receive fan motors of different dimensions. The motor mount may have a space in which a fan motor of any suitable size may be disposed. The motor mount may have adjustable components that enable securement of the fan motor in the space and/or that enable positional adjustment of the fan motor in the space. As such, a single embodiment of the motor mount may be manufactured and implemented with different HVAC systems such that different fan motors may be securely positioned within the HVAC systems using the adjustable motor mount. Thus, costs associated with manufacturing and maintaining HVAC systems may be reduced.

Figure 1:
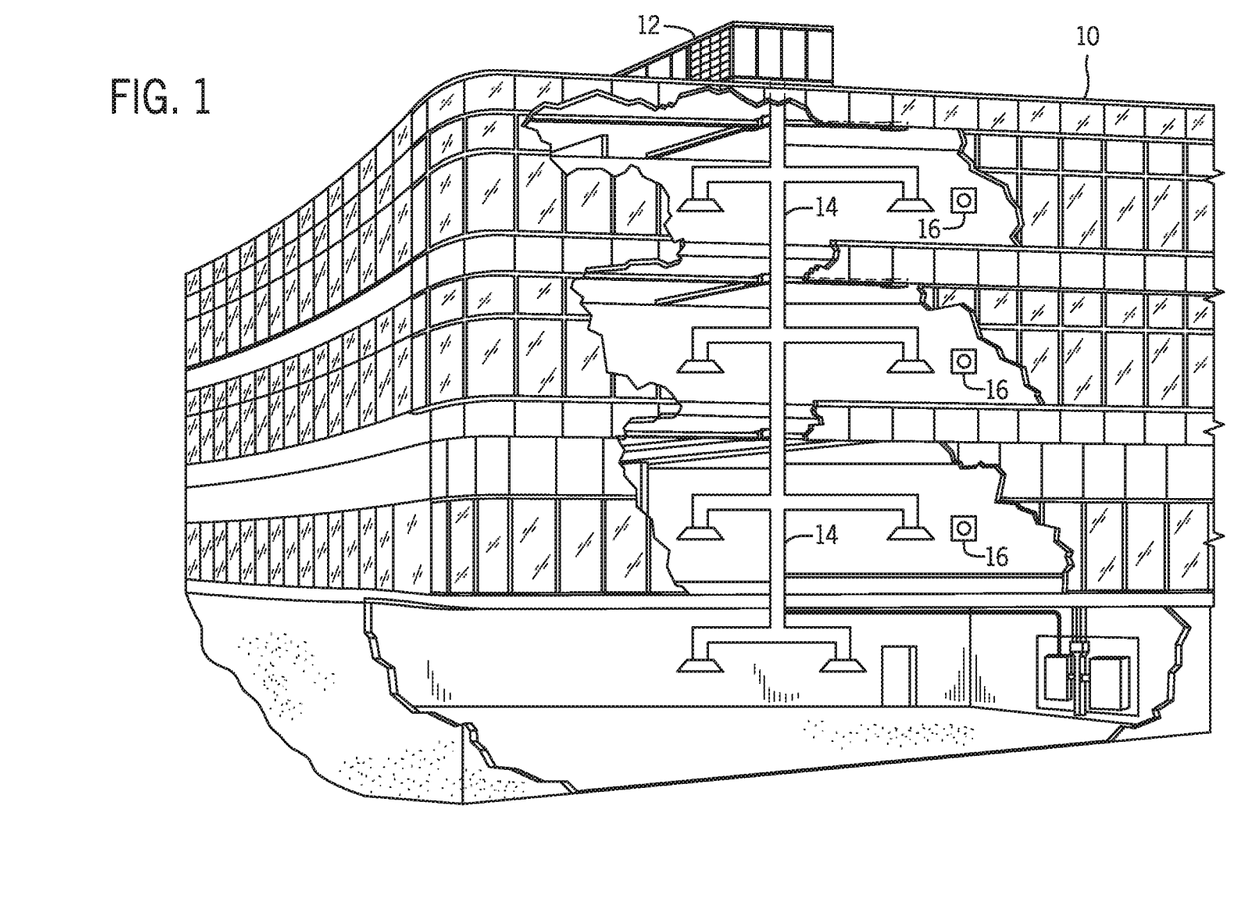
FIG. 1 is a perspective view of an embodiment of a heating, ventilation, and/or air conditioning (HVAC) system for environmental management that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
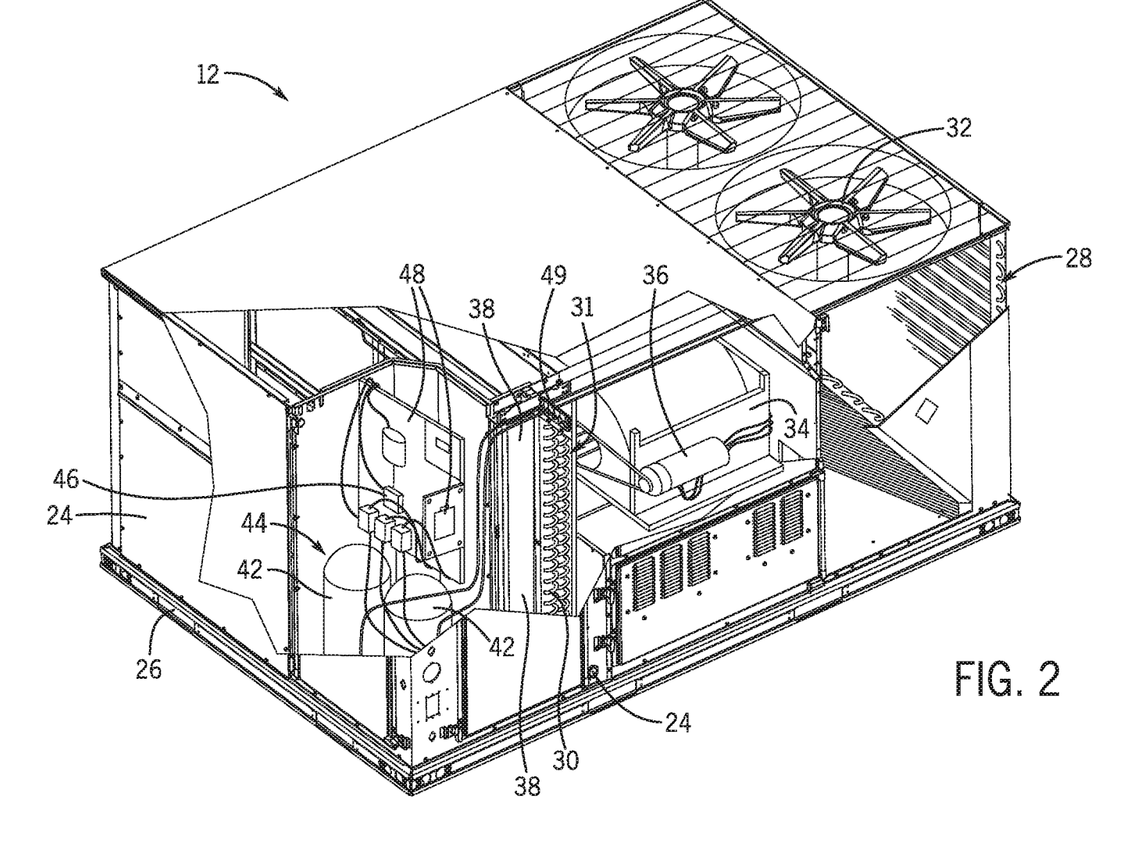
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
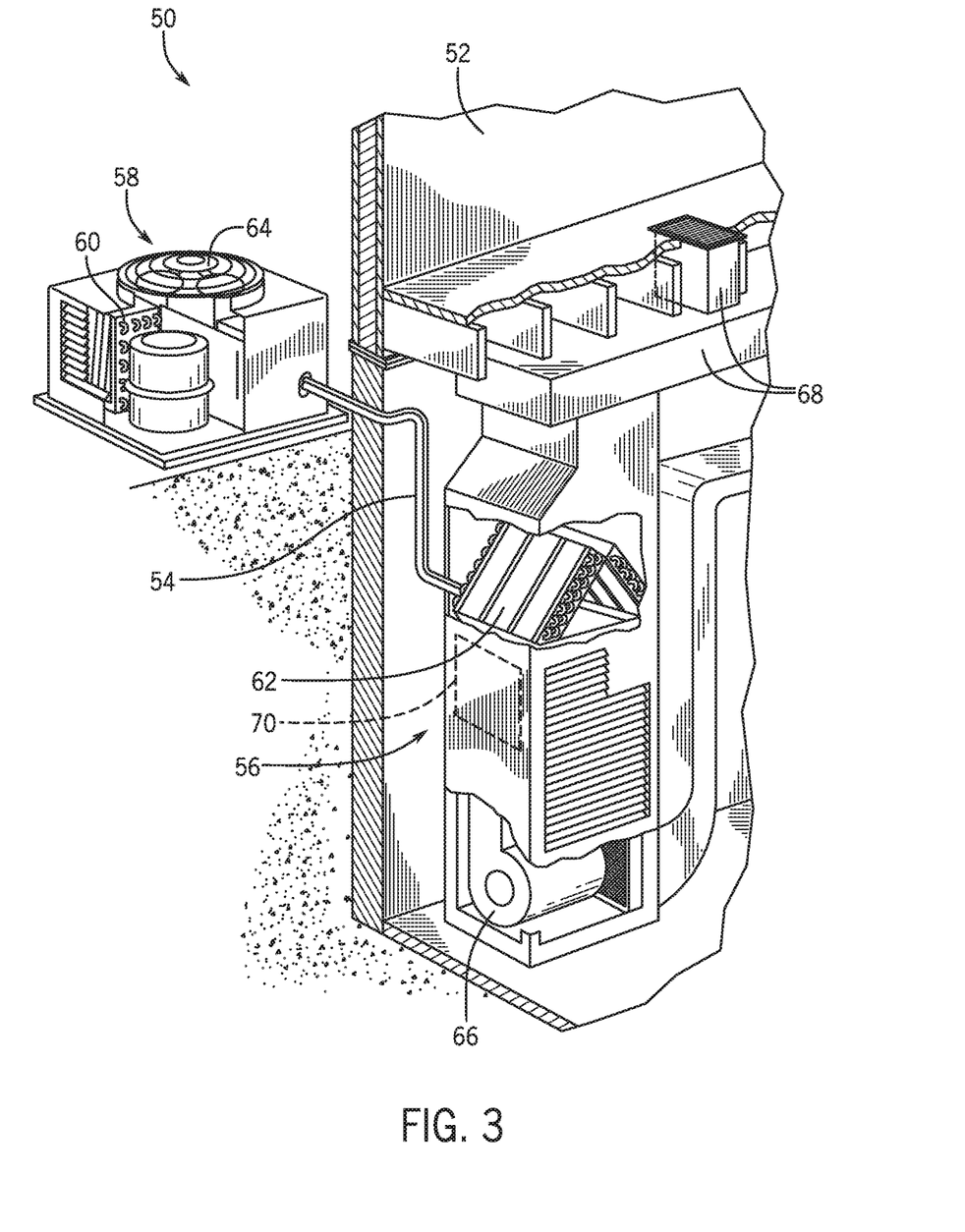
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
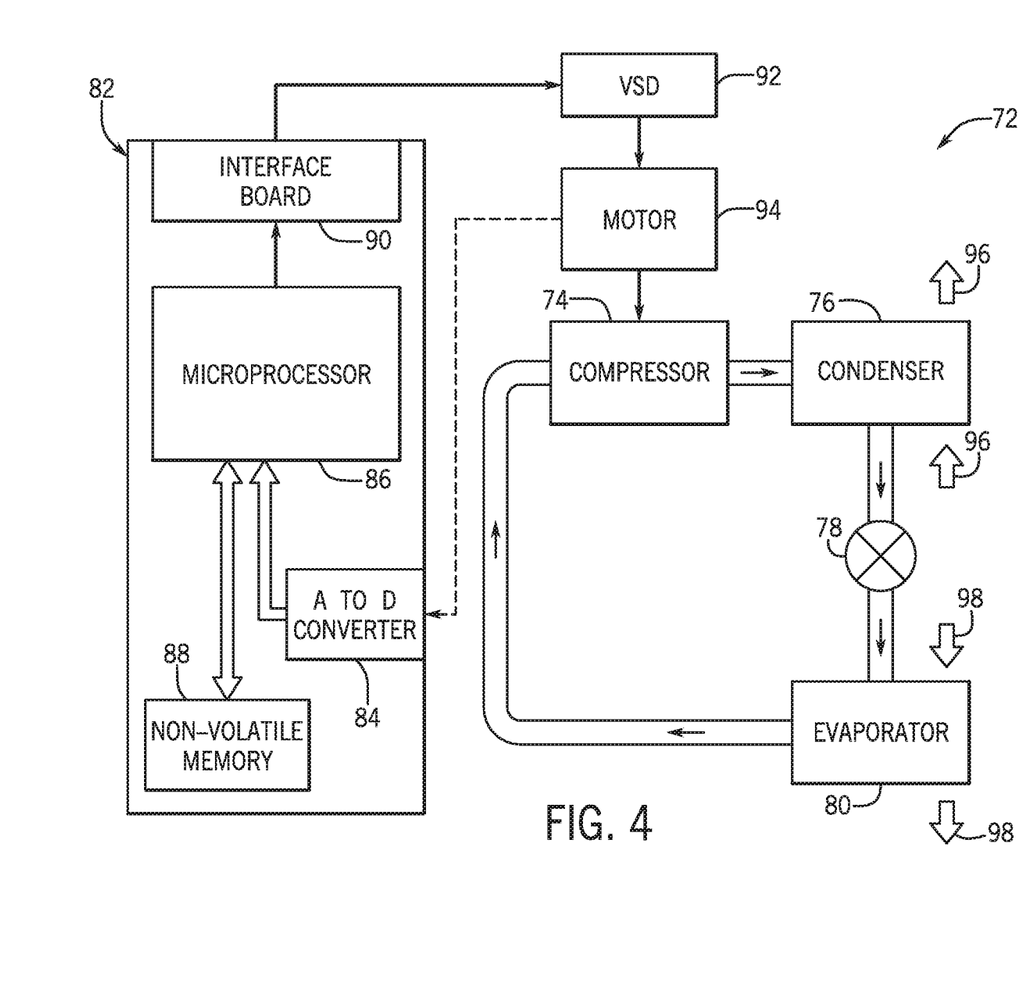
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

An HVAC system, such as the HVAC unit 12 and/or the residential heating and cooling system 50, may include one or more fans configured to draw or force air across a component of the HVAC system, such as a heat exchanger of the HVAC system. For example, the fans may be utilized to cool a refrigerant and/or an air flow of the HVAC system. Each fan may be driven by a respective motor, and each motors may be received and supported by a respective motor mount configured to secure the motor and corresponding fan to the HVAC system. In accordance with present techniques, the motor mount may be configured to receive fan motors of different sizes. For example, the motor mount may have plates configured to capture or secure a received fan motor, where the plates are adjustable to accommodate fan motors of various dimensions, such as circumferences. In some embodiments, the motor mount may be configured to adjust a position of the received fan motor relative to the motor mount. As an example, the motor mount may have a bolt, and the bolt may be adjustable to change a position of the received fan motor relative to the motor mount. In this way, a position of the fan coupled to the fan motor may be adjusted relative to other components of the HVAC system and/or the motor mount may be adjusted to accommodate fan motors of different lengths.

Figure 5:
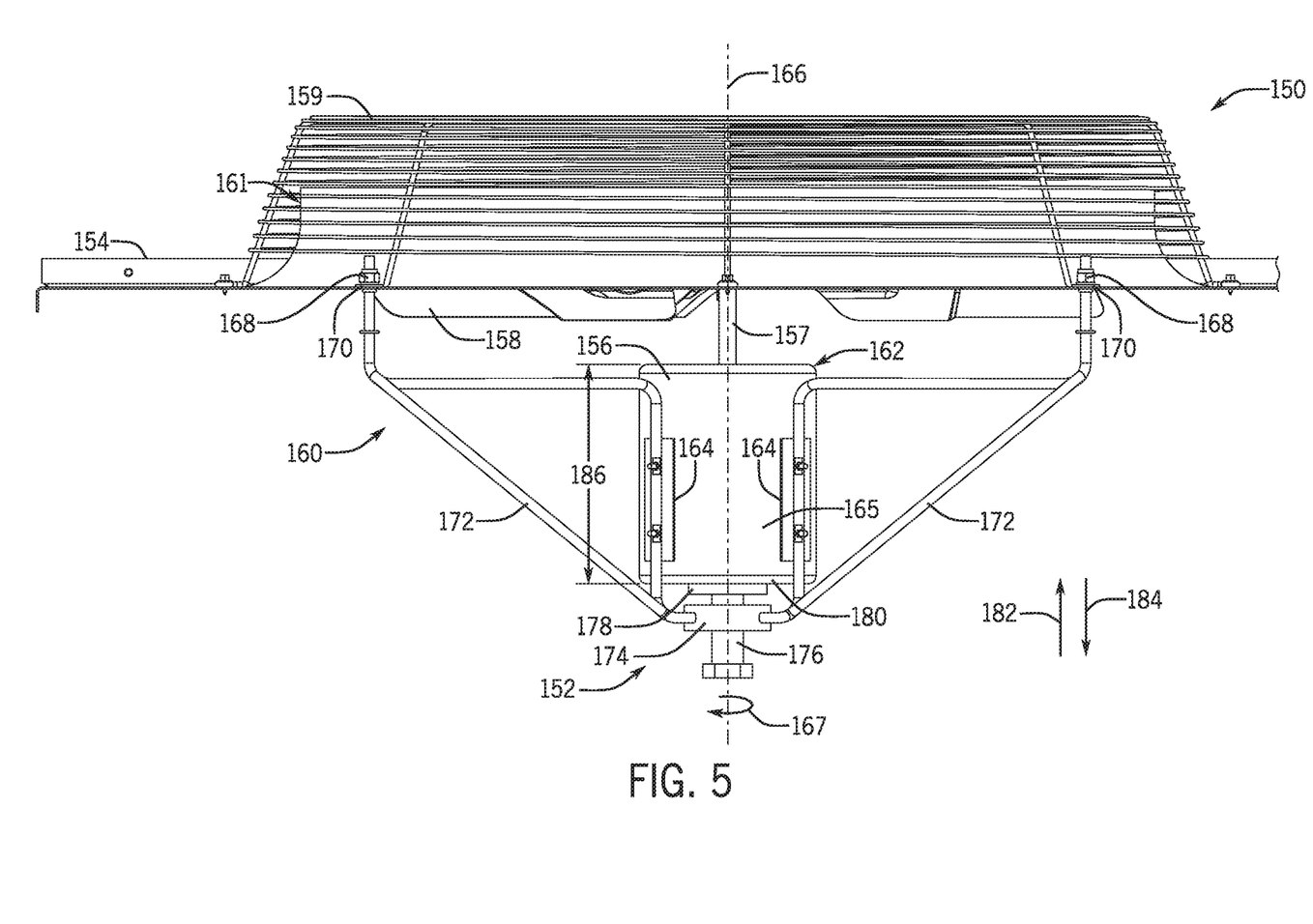
FIG. 5 is a side view of an embodiment of a fan system having an adjustable motor mount system coupled to an enclosure of an HVAC system, in accordance with an aspect of the present disclosure.

FIG. 5 is a side view of an embodiment of a fan system 150 having an adjustable mounting assembly 152 coupled to an enclosure 154 of an HVAC system, such as an enclosure of the HVAC unit 12 or the outdoor unit 58 of the residential and heating cooling system 50. For example, in the illustrated embodiment, the enclosure 154 is a fan deck configured to support the fan system 150. The mounting assembly 152 may be configured to receive a motor 156 having a shaft 157 coupled to a fan 158 of the fan system 150. In some embodiments, the fan system 150 may be a part of a condenser system configured to condense or cool a refrigerant flowing therethrough. For example, the motor 156 may cause the shaft 157 may rotate, which causes the fan 158 to rotate and draw or force air across one or more heat exchanger coils of the condenser system to cool the refrigerant therein. After the air is drawn or forced across the heat exchanger coils, the fan 158 may force the air flow through a fan orifice 161 having a boundary formed in the enclosure 154. Additionally, a shroud 159 may be coupled to the enclosure 154, and the shroud 159 may enclose the fan 158. For instance, the shroud 159 may block debris from contacting the fan 158 or the motor 156 during operation of the HVAC system.

The mounting assembly 152 may include a frame 160 defining a space 162 in which the motor 156 may be disposed and secured. The mounting assembly 152 may also include a plurality of plates 164 coupled to the frame 160 and disposed within the space 162. Each plate 164 of the plurality of plates 164 may be adjustable relative to the frame 160 to enable abutment between the plurality of plates 164 and the motor 156. In this way, the motor 156 may be captured and secured within the space 162 by the plurality of plates 164. For example, a position of each plate 164 may be adjusted so that each plate 164 presses against a body 165 of the motor 156 to secure the motor 156 and restrict movement of the motor 156. For instance, in an installed configuration of the mounting assembly 152, the plurality of plates 164 may reduce vibrational movement of the motor 156 caused by rotation of the fan 158. In some embodiments, each plate 164 may be formed from a rigid material, such as a metal, a composite, or any combination thereof, to restrict movement of the motor 156. Moreover, each plate 164 may have a shape, curve, or contour that substantially matches with the body 165 or a portion of the body 165 in order to capture the motor 156 within the space 162.

As mentioned herein, each plate 164 may be adjustable within the space 162 to capture the motor 156 based on a size of the body 165 of the motor 156. For example, the position of each plate 164 may be adjusted to increase an available area within the space 162 and to enable the motor 156 to be disposed within the space 162. After the motor 156 is positioned in the space 162, the position of each plate 164 may be adjusted and set so that each plate 164 abuts the motor 156 and the plurality of plates 164 secures the motor 156 within the space 162. Furthermore, while the position of each plate 164 is set, the motor 156 and the shaft 157 may be concentrically and/or coaxially aligned with a centerline 166 of the fan orifice 161, such that the fan 158 is also concentrically aligned with the centerline 166. In this manner, the fan 158 may rotate about the centerline 166, such as in a rotational direction 167, within the fan orifice 161.

The frame 160 may include a plurality of extensions 168 configured to couple the frame 160 to the enclosure 154. In certain embodiments, the enclosure 154 may include a plurality of openings or apertures 170 through which each mounting extension 168 of the motor 156 may be inserted. Each extension 168 may then be fastened to the respective opening 170 to secure the frame 160 to the enclosure 154. In particular, the frame 160 is secured to the enclosure 154 such that the frame 160 extends into the enclosure 154 on a side opposite the shroud 159. Moreover, the geometry of each extension 168 may substantially match the geometry of each opening 170, such that the openings 170 block movement of the extensions 168 and the mounting assembly 152 relative to the enclosure 154.

The frame 160 may also include a plurality of frame members 172, in which each frame member 172 of the plurality of frame members 172 couples to one of the extensions 168. The plurality of frame members 172 also at least partially defines the space 162 in which the motor 156 may be positioned. Each frame member 172 may be coupled to a fixed nut 174 of the mounting assembly 152 and may extend from the fixed nut 174 toward the enclosure 154 in the installed configuration of the mounting assembly 152. Additionally, the frame members 172 may be positioned relative to and/or about the fixed nut 174, such that the extensions 168 align with the position of the openings 170 in the enclosure 154. In some implementations, the position of the openings 170 on enclosures 154 of different HVAC systems may each be substantially similar to one another. As such, the position of the extensions 168 may match or align with the openings 170 of other enclosures 154 to enable coupling of the mounting assembly 152 to the other enclosures 154. For this reason, the mounting assembly 152 may be retrofit onto existing enclosures 154 to enable the existing enclosures 154 to be utilized with differently-sized motors 156.

In some implementations, the fixed nut 174 may also be positioned concentrically with the centerline 166 when the frame 160 is coupled to the enclosure 154 in the installed configuration of the mounting assembly 152. The fixed nut 174 may have a circular, rectangular, hexagonal, or other suitable geometric shape to enable the frame members 172 to couple to at least a portion of the perimeter of the fixed nut 174. The mounting assembly 152 may further include a bolt 176 that extends through the fixed nut 174 and into the space 162. A base plate 178 may be coupled to the bolt 176 within the space 162 and may be transverse, such as approximately perpendicular, to the plates 164 to abut a base 180 of the motor 156. The base plate 178 and the fixed nut 174 may each support the motor 156 positioned within the space 162. In some embodiments, a position of the bolt 176 within the space 162 may be adjustable. For example, the bolt 176 may be configured to move along the centerline 166, such as in a first longitudinal direction 182 and in a second longitudinal direction 184, via rotation of the bolt 176 relative to the fixed nut 174. Accordingly, the position of the motor 156 and the fan 158 may also be adjusted accordingly relative to the frame 160. For example, the bolt 176 may be rotated relative to the fixed nut 174 to move the fan 158 to a particular position within the fan orifice 161 and/or to accommodate different motors 156 having different longitudinal lengths 186 while maintaining a position of the fan 158 relative to the fan orifice 161. More specifically, in one embodiment, the bolt 176 may be rotated in a clockwise direction to move the base plate 178, the motor 156, and the fan 158 in the first longitudinal direction 182, and the bolt 176 may be rotated in a counter-clockwise direction to move the base plate 178, the motor 156, and the fan 158 in the second longitudinal direction 184.

Figure 6:
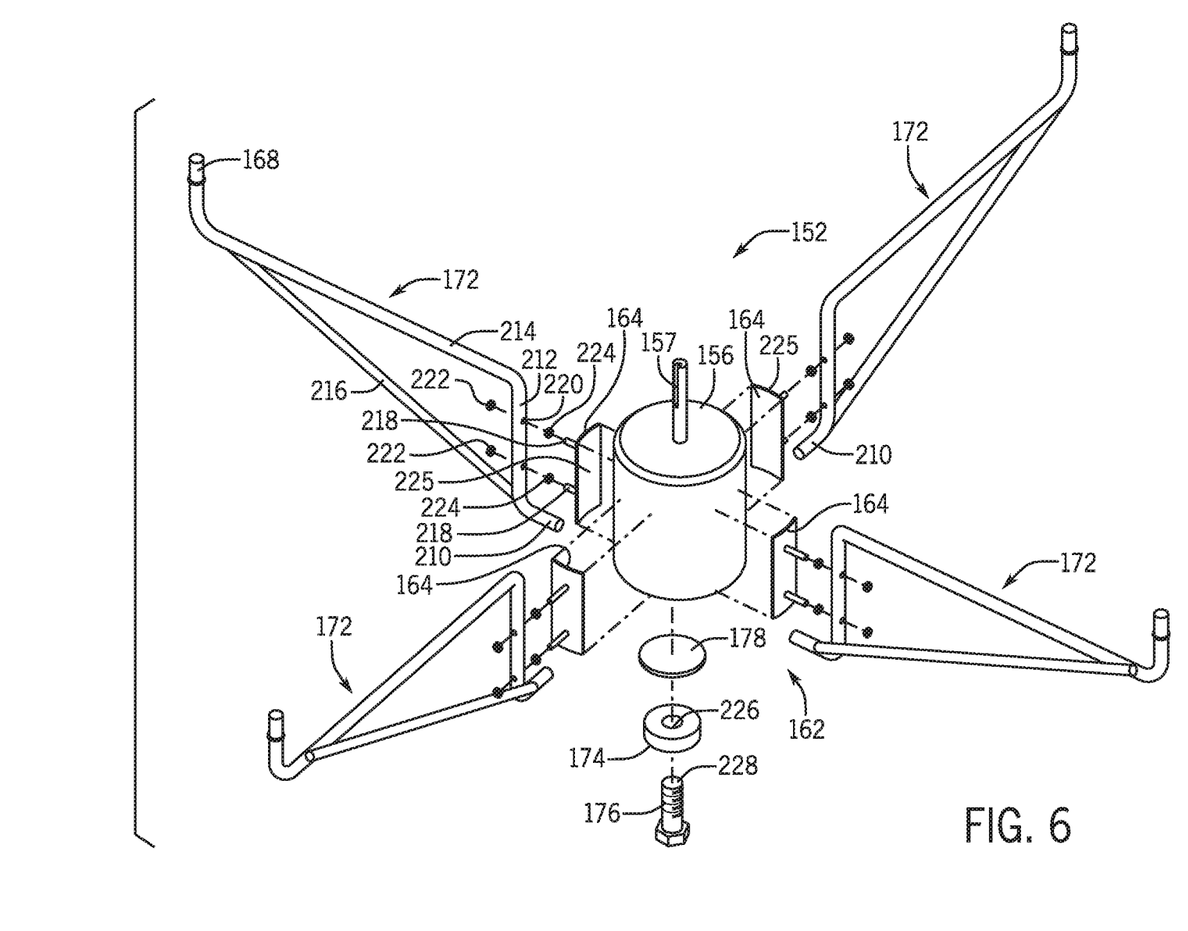
FIG. 6 is an exploded perspective view of an embodiment of an adjustable motor mount system, in accordance with an aspect of the present disclosure.

FIG. 6 is an exploded perspective view of an embodiment of the mounting assembly 152 configured to receive and support the motor 156. In the illustrated embodiment, the mounting assembly 152 includes four frame members 172. In additional or alternative embodiments, the mounting assembly 152 may have any suitable number of frame members 172, such as three frame members 172 or more than five frame members 172, that at least partially surround a perimeter of the motor 156 to secure the motor 156 within the space 162. With reference to one of the frame members 172, the frame member 172 may include a protrusion 210 that curves into a vertical segment 212. The protrusion 210 is configured to couple to the fixed nut 174 discussed herein. The vertical segment 212 curves into a horizontal segment 214, which extends into the extension 168 configured to couple to the enclosure 154. Each frame member 172 may include similar features and/or components. Moreover, each frame member 172 may include a support segment 216 that may provide additional structural support for each frame member 172, such as to support a weight of the motor 156 and/or block movement or deflection of the vertical segment 212 and/or protrusion 210 relative to the horizontal segment 214. As an example, the support segment 216 may couple to the protrusion 210 and extend toward the extension 168 and may couple to the horizontal segment 214.

The vertical segment 212 of each frame member 172 may be configured to couple with one of the plurality of plates 164. For example, with reference to one of the plates 164, the plate 164 may include or be coupled with one or more rods 218 configured to extend through respective openings 220 of the vertical segment 212. In the illustrated embodiment, each plate 164 may have two rods 218, and each vertical segment 212 may have two openings 220 configured to receive the rods 218. However, other embodiments of the plates 164 may have a different number of rods 218, and each vertical segment 212 may have a corresponding number of openings 220. Furthermore, each plate 164 may be coupled to one of the vertical segments 212 via a first nut 222 and a second nut 224 of each rod 218. For example, the rods 218 may each be threaded rods and the first nut 222 and/or the second nut 224 may be threaded onto one of the rods 218. Adjustment of the first nut 222 and the second nut 224 along the rod 218 may enable adjustment of the plate 164 within the space 162 and with respect to the vertical segment 212. Furthermore, tightening of the first nut 222 and/or the second nut 224 may set a position of the plate 164 with respect to the vertical segment 212. As an example, the first nut 222 and the second nut 224 may compress together against the vertical segment 212 of the frame member 172 to block movement of the rods 218 and of the plate 164 relative to the vertical segment 212. Additional details regarding the movement of the plate 164 via the adjustment of the first nut 222 and the second nut 224 will be further discussed below. In some embodiments, a damping material, such as foam or polymeric material, may be disposed onto a face 225 of each plate 164. As such, the plate 164 may be positioned to abut the damping material against the motor 156 and further restrict movement of the motor 156.

The fixed nut 174 may include a hole 226 through which the bolt 176 may extend. That is, a first end 228 of the bolt 176 may extend through the hole 226 and into the space 162. As illustrated, the hole 226 may have a geometry that substantially matches the geometry of the bolt 176 to restrict movement of the bolt 176, such as lateral movement and/or axial movement, within the fixed nut 174. In some embodiments, the hole 226 may be a threaded hole, and the bolt 176 may be a threaded bolt, thereby enabling threaded engagement between the hole 226 and the bolt 176. The base plate 178 may couple to the first end 228 of the bolt 176 that extends through the fixed nut 174 into the space 162. As mentioned above, the motor 156 may rest on the base plate 178 within the space 162. Specifically, the bolt 176 may be rotated within the fixed nut 174 to position the motor 156 resting on the base plate 178 at a desired height or location within the space 162.

Figure 7:
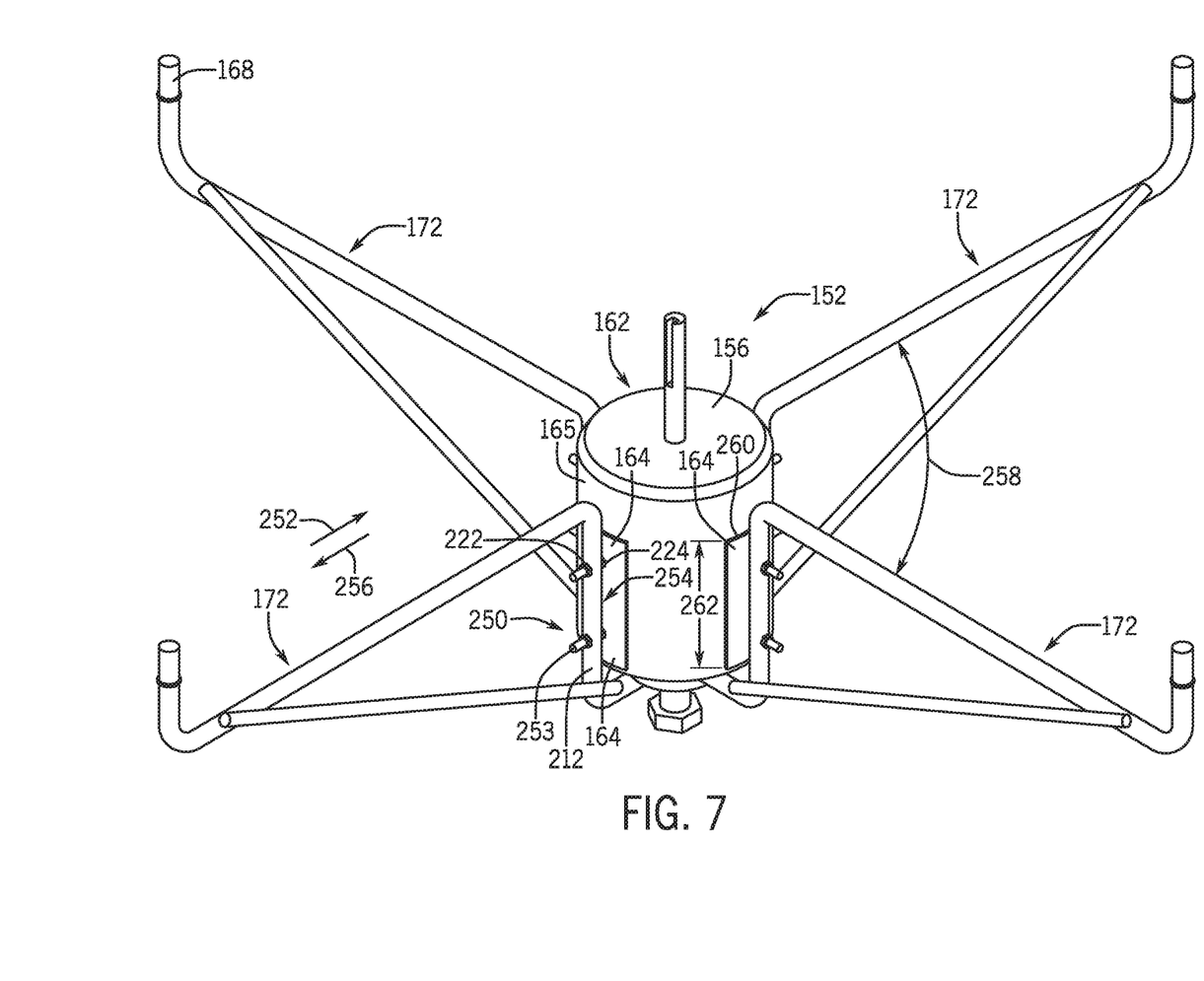
FIG. 7 is a perspective view of an embodiment of the adjustable motor mount system of FIG. 7, in accordance with an aspect of the present disclosure.

FIG. 7 is a perspective view of the mounting assembly 152 securing the motor 156 within the space 162. With reference to one of the frame members 172, the first nut 222 may abut against a first side 250 of the vertical segment 212, thereby blocking the plate 164 from moving in a first direction 252 away from the vertical segment 212. As such, the first nut 222 may be positioned at an exposed end 253 of the rod 218 extending through the vertical segment 212. The second nut 224 may abut against a second side 254 of the vertical segment 212 that is opposite the first side 250 of the vertical segment 212, thereby blocking the plate 164 from moving in a second direction 256 toward the vertical segment 212. That is, the second nut 224 may be positioned and be adjustable along the rod 218 between the vertical segment 212 and the plate 164.

In the illustrated embodiment, each frame member 172 is positioned equally from one another about the fixed nut 174 and/or about a circumference of the motor 156. That is, each frame member 172 may be disposed at a substantially similar angle 258 from one another. Additionally or alternatively, each frame member 172 may be disposed at different angles 258 relative to one another. Moreover, each plate 164 may be a curved plate having an arc 260 that spans a particular arc degree. In certain embodiments, the arc 260 associated with each plate 164 may span an arc degree that is small enough to receive motors 156 having relatively small bodies 165, but large enough to capture motors 156 having relatively large bodies 165. In other words, the magnitude of the arc 260 may be selected to enable the plates 164 to adequately capture a smallest size of motor 156 that may be positioned within the space 162 in a potential or likely embodiment and also to adequately capture a largest size of motor 156 that may be positioned within the space 162 in another potential or likely embodiment. For example, the arc degree may be between 5 degrees and 30 degrees. The illustrated embodiment shows the arc 260 of each plate 164 as having substantially the same arc degree, but in alternative embodiments, different plates 164 may have arcs 260 having different arc degrees. Moreover, each arc 260 may have a certain radius, such as a radius between 1 centimeter (cm) and 15 cm, and a certain longitudinal length 262, such as between 2 cm and 20 cm, to capture a range of particularly sized motors 156 effectively.

In further implementations, each plate 164 may be removably coupled to the respective frame members 172 to enable different plates 164 to be utilized with the mounting assembly 152 for different motors 156. By way of example, plates 164 having a particularly sized arc 260, longitudinal length 262, and so forth, may be implemented based on the size of the motor 156. In this manner, if it is desired to replace one motor 156 having a first dimension utilized with the fan system 150 with another motor 156 having a second dimension, some of the plates 164 may be replaced with other plates 164 to enable improved contact with and/or capture of the second motor 156.

Figure 8:
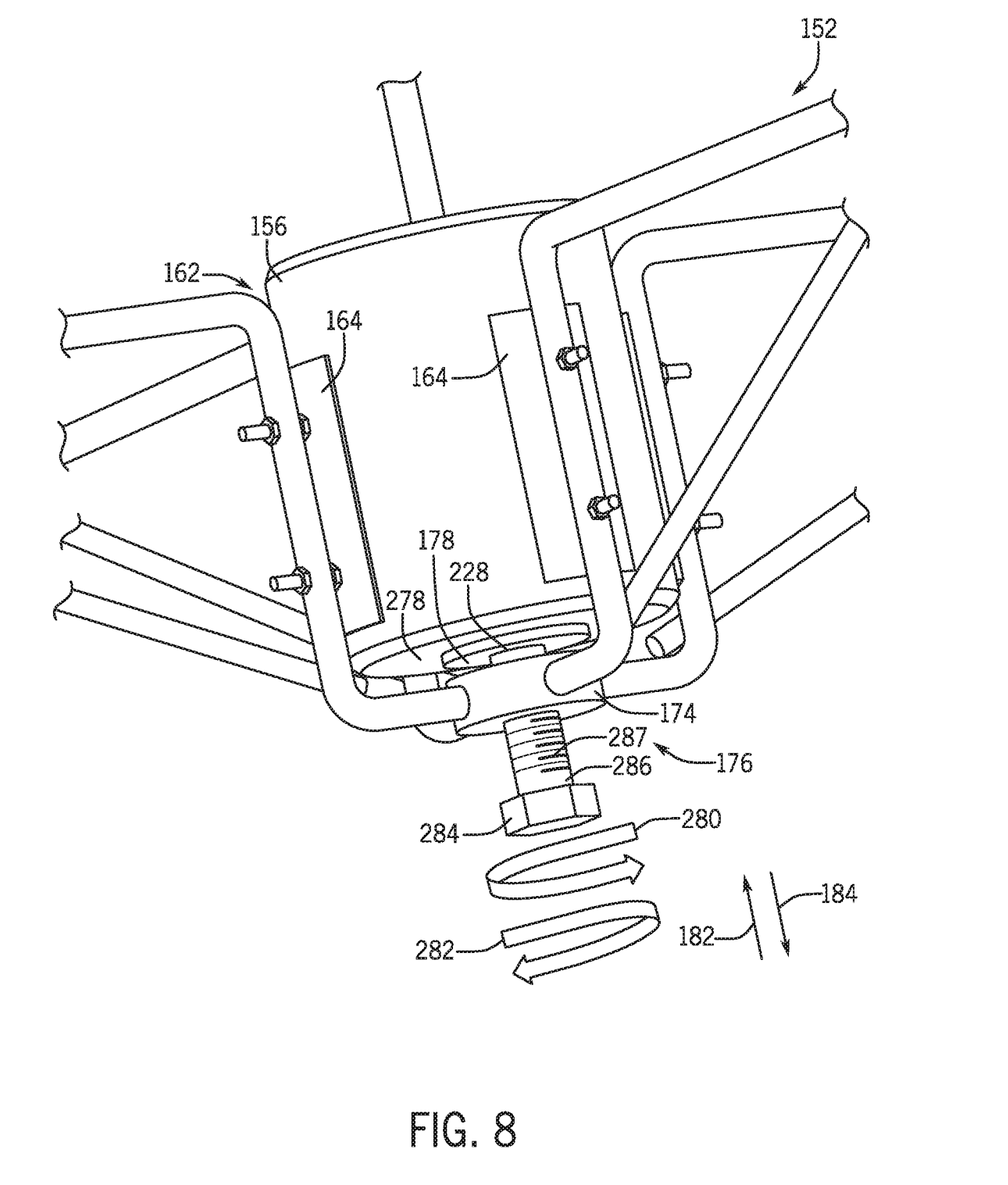
FIG. 8 is a partial perspective view of an embodiment of the adjustable motor mount system of FIGS. 7 and 8, in accordance with an aspect of the present disclosure.

FIG. 8 is a partial perspective view of the mounting assembly 152 securing the motor 156 within the space 162. As shown in FIG. 8, the base plate 178 is coupled to the first end 228 of the bolt 176 extending through the fixed nut 174. The base plate 178 may engage a base 278 of the motor 156 to support the motor 156 in the space 162. In addition, the bolt 176 may be adjustable relative to the fixed nut 174 to change a position of the motor 156 within the space 162. In some embodiments, the bolt 176 may thread through the fixed nut 174, such that rotation of the bolt 176 adjusts the amount of the bolt 176 that extends through the fixed nut 174 and into the space 162, thereby adjusting a position of the base plate 178 and the motor 156 within the space 162. For example, rotation of the bolt 176 in a first rotational direction 280 may move the bolt 176 and the motor 156 in the first longitudinal direction 182, and rotation of the bolt 176 in a second rotational direction 282 may move the bolt 176 and the motor 156 in the second longitudinal direction 184. In certain embodiments, the bolt 176 may include a second end 284 that may facilitate rotation of the bolt 176 relative to the fixed nut 174. In the illustrated embodiment, the second end 284 has a hexagonal shape, which may enable a user to grip the bolt 176 and manually rotate the bolt 176. In such embodiments, the user may additionally or alternatively use a tool, such as a screw driver, a wrench, a drill, or any other suitable device, configured to couple to the second end 284 and rotate the bolt 176. In further embodiments, the bolt 176 may be adjustable relative to the fixed nut 174 by other methods. For instance, a longitudinal force may be applied to the bolt 176 to push or pull the bolt 176 relative to the fixed nut 174.

The bolt 176 may include a main segment 286 that extends from the second end 284 to the first end 228. The main segment 286 may extend through the hole 226 of the fixed nut 174. In some embodiments, the main segment 286 may have markings 287 to indicate a position of the bolt 176 with respect to the fixed nut 174, such as an amount that the first end 228 extends into the space 162 or a position of the base plate 178 within the space 162. For example, the main segment 286 may have tick marks, numberings, or another visual indicator that may be observed by the user adjusting the bolt 176 to enable the user to gauge more accurately or determine the position of the motor 156 within the space 162.

Moreover, the mounting assembly 152 may include a locking mechanism configured to maintain a position of the bolt 176 within the fixed nut 174. The locking mechanism may be actuated when the motor 156 is in a desirable position with the space 162, such that the position of the bolt 176 and the motor 156 is maintained within the space 162. When the motor 156 is to be moved, the locking mechanism may released, such that the bolt 176 may be adjustable relative to the fixed nut 174 to enable positional adjustment of the motor 156.

Figure 9:
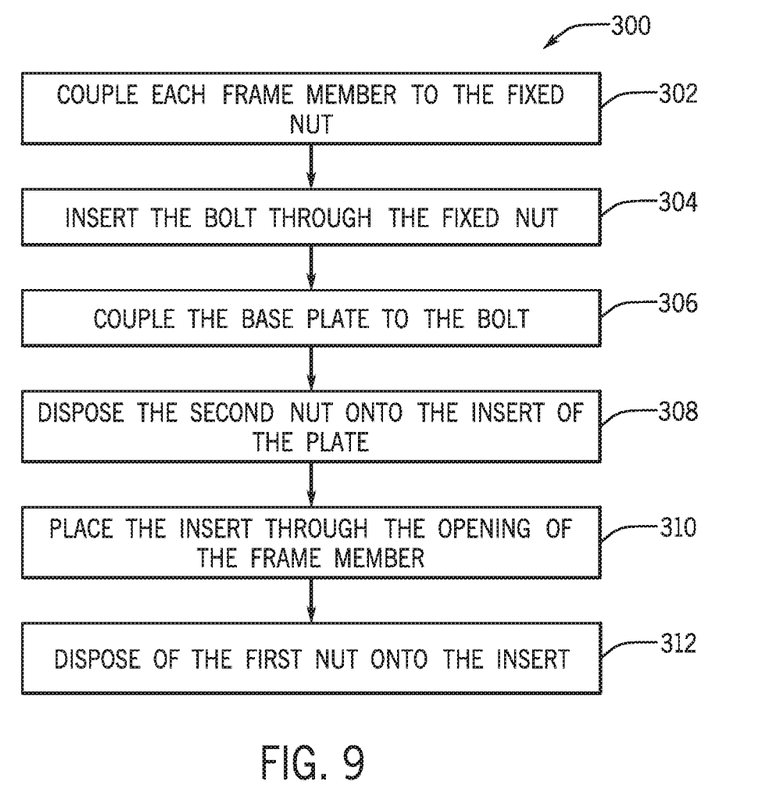
FIG. 9 is a block diagram of an embodiment of a method for assembling an adjustable motor mount system, in accordance with an aspect of the present disclosure.
Figure 10:
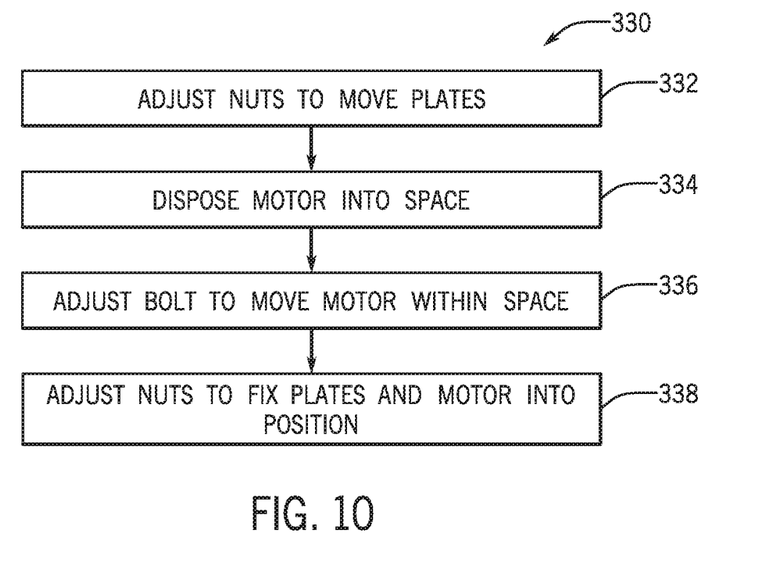
FIG. 10 is a block diagram of an embodiment of a method for securing a motor within an adjustable motor mount system, in accordance with an aspect of the present disclosure.

FIGS. 9 and 10 illustrate, respectively, a method for assembling the mounting assembly 152 together and a method for securing the motor 156 in the space 162 with the mounting assembly 152. It should be noted that additional or different steps may be performed as compared to the respective steps depicted in FIGS. 9 and 10. For example, the steps of FIGS. 9 and 10 may be different for a different embodiment of the mounting assembly 152 and/or the steps may be performed in any suitable order.

FIG. 9 illustrates an embodiment of a method or process 300 for assembling the mounting assembly 152. At block 302, each frame member 172 is coupled to the fixed nut 174. For example, each frame member 172 may be coupled to the fixed nut 174 via welds, fasteners, adhesives, threads, another suitable method of coupling, or any combination thereof, such that each frame member 172 is fixed to the fixed nut 174. The space 162 is formed and defined by the frame members 172, such as between the vertical members 212, and the fixed nut 174.

At block 304, the bolt 176 is inserted through the hole 226 of the fixed nut 174 until a portion of the bolt 176, such as the first end 228, extends into the space 162. As discussed herein, the bolt 176 may thread through the fixed nut 174. Thus, the bolt 176 may be rotated to extend through the fixed nut 174 and into the space 162. In additional or alternative embodiments, the bolt 176 may be pushed through the fixed nut 174 without rotating the bolt 176 to extend the bolt 176 through the fixed nut 174.

At block 306, the base plate 178 may be coupled to the first end 228 of the bolt 176 that is extended through the fixed nut 174 into the space 162. For example, the base plate 178 may be coupled to the first end 228 via welds, fasteners, adhesives, threads, another suitable method of coupling, or any combination thereof. In some implementations, a particular base plate 178 may be selected based on a certain motor 156 to be disposed within the space 162. For example, the base plate 178 may have a certain size, such as a particular diameter, surface area, and the like, to support the base 278 of the motor 156 effectively.

At block 308, respective second nuts 224 are disposed onto each rod 218 of the plates 164. As mentioned, each second nut 224 may be threaded onto the respective rods 218, and the position of the second nut 224 along the rod 218 may be adjustable by rotating the second nut 224 relative to the rod 218. After the second nuts 224 are disposed onto the rods 218, the rods 218 of each plate 164 are aligned with the respective openings 220 of each vertical segment 212 of the frame members 172, as indicated at block 310. The rods 218 are then placed through the openings 220 until the second nuts 224 abut the respective second sides 254 of each vertical segment 212, and the exposed ends 253 of the rods 218 extend through the vertical segment 212.

At block 312, the respective first nuts 222 may then be disposed onto the respective exposed ends 253 of each rod 218 of the plates 164. The first nuts 222 may be adjusted with respect to the rods 218 until each first nut 222 abuts the respective first sides 250 of the vertical members 212. As such, the first nuts 222 block each plate 164 from sliding in the first direction 252 that would remove the rods 218 from the respective openings 220. In this manner, the first nuts 222 secure each rods 218 within the respective openings 220 and secures each plate 164 onto the respective vertical members 212 of each frame member 172.

FIG. 10 is a block diagram of an embodiment of a method 330 for securing the motor 156 in the space 162 via the mounting assembly 152. For example, FIG. 10 is described with reference to the mounting assembly 152 that has already been assembled, such as by the steps described with reference to FIG. 9. At block 332, the first nut 222 and the second nut 224 are adjusted to move each plate 164 toward the respective vertical segment 212. As an example, each second nut 224 may be moved along the respective rods 218 in the second direction 256 along the rod 218 away from the vertical segment 212 until the second nuts 224 abut the respective plates 164. Each plate 164 may then be moved in the first direction 252 toward the respective vertical segments 212 such that each second nut 224 abuts the respective vertical segments 212. In this manner, the opening of the space 162 may be defined to receive the motor 156.

At block 334, the motor 156 is disposed into the space 162. For example, the motor 156 may be positioned such that the base 278 engages or rests on the base plate 178 coupled to the bolt 176. The bolt 176 may then be adjusted relative to the fixed nut 174 to change a position or height of the motor 156 within the space 162, as shown at block 336. As mentioned herein, the bolt 176 may be rotated to adjust the position of the base plate 178, or the bolt 176 may be pushed and/or pulled to adjust the position of the base plate 178.

Once the motor 156 is placed in the desired position within the space 162, the first nuts 222 and the second nuts 224 may each be adjusted to secure the motor 156 within the space 162, as indicated at block 338. By way of example, each first nut 222 may be moved in the first direction 252 along the rod 218 away from the respective vertical segments 212, and each plate 164 may then be moved in the second direction 256 toward the body 165 of the motor 156. Once each plate 164 has been moved to abut a portion of the body 165, the respective first nuts 222 may be moved in the second direction 256 along the rod 218 to abut against the respective first sides 250 of the vertical segments 212. Furthermore, each second nut 224 may be moved in the first direction 252 along the rod 218 to abut against the respective second sides 254 of the vertical segments 212. In this manner, the respective first nuts 222 and the second nuts 224 each abut against the vertical segments 212 to block movement of each plate 164 relative to the vertical segments 212 and secure the motor 156 within the space 162.

The present disclosure may provide one or more technical effects useful in the operation of an HVAC system. For example, the HVAC system may use one or more fans to cool a component of the HVAC system. The fans may each be coupled to a respective motor configured to rotate the fans. Each motor may be secured to the HVAC system, such as to an enclosure, via a motor mount. Each motor mount may include a frame that defines a space in which the motor may be disposed. The space may be large enough to accommodate the size of any suitable motor that may be implemented in the HVAC system. In some embodiments, each motor mount may have a bolt that extends into the space, and the bolt may be adjustable relative to the space to adjust a position of the motor within the space. Moreover, each motor mount may have plates coupled to the frame, in which the plates are adjustable and may abut against a motor disposed in the motor mount. The plates may secure the motor within the space to maintain a position of the motor within the motor mount. The motor mount may be readily installed onto enclosures of different HVAC systems. In this manner, the motor mount of the present disclosure may enable different HVAC systems to utilize differently-sized motors without having to manufacture different embodiments of motor mounts to accommodate motors of different sizes. As such, the motor mount may reduce a cost associated with installing different motors in different HVAC systems. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An adjustable mounting assembly for a fan motor, comprising:
    a frame defining a space configured to receive the fan motor, wherein the frame is configured to mount to a heating, ventilation, and/or air conditioning (HVAC) unit;
    a fixed nut coupled to the frame; and
    a bolt extending through the fixed nut and into the space, wherein the bolt is adjustable relative to the fixed nut to adjust a position of the fan motor within the space.

2. The adjustable mounting assembly of claim 1, comprising a plurality of plates coupled to the frame and disposed within the space, wherein a respective position of each plate of the plurality of plates within the space is adjustable.

3. The adjustable mounting assembly of claim 2, comprising a base plate coupled to an end of the bolt, wherein the base plate is configured to support a base of the fan motor within the space.

4. The adjustable mounting assembly of claim 3, wherein the base plate is transverse to each plate of the plurality of plates.

5. The adjustable mounting assembly of claim 2, wherein a plate of the plurality of plates includes a threaded rod coupled to the plate and to the frame, wherein the adjustable mounting assembly includes an adjustable nut disposed about the threaded rod, such that rotation of the adjustable nut enables adjustment of the position of the plate within the space.

6. The adjustable mounting assembly of claim 5, wherein the adjustable nut is a first adjustable nut, and the adjustable mounting assembly includes a second adjustable nut disposed about the threaded rod, such that rotation of the first adjustable nut and the second adjustable nut secures the position of the plate within the space.

7. The adjustable mounting assembly of claim 2, wherein each plate of the plurality of plates is a curved plate.

8. The adjustable mounting assembly of claim 7, wherein each curved plate has an arc degree between 5 degrees and 30 degrees.

9. The adjustable mounting assembly of claim 1, wherein the frame includes a plurality of frame members, wherein each frame member of the plurality of frame members is coupled to the fixed nut.

10. The adjustable mounting assembly of claim 1, wherein the bolt and the fixed nut are each threaded, such that rotation of the bolt relative to the fixed nut adjusts a position of the fan motor within the space.

11. An adjustable mounting assembly for a fan motor, comprising:
   a frame defining a space configured to receive the fan motor, wherein the frame includes a frame member configured to couple to a heating, ventilation, and/or air conditioning (HVAC) unit;
   a fixed nut coupled to the frame member and configured to support the fan motor; and
   a plate configured to couple to the frame member and extend into the space, wherein a position of the plate relative to the frame member is adjustable.

12. The adjustable mounting assembly of claim 11, wherein the frame member includes a segment having an opening, the plate has a rod, and the rod is configured to extend through the opening.

13. The adjustable mounting assembly of claim 12, comprising a first adjustable nut disposed about the rod and a second adjustable nut disposed about the rod, wherein the first adjustable nut and the second adjustable nut are each configured to move along the rod to enable adjustment of a position of the plate relative to the frame member.

14. The adjustable mounting assembly of claim 13, wherein the first adjustable nut is configured to abut a first side of the segment, and the second adjustable nut is configured to abut a second side of the segment to maintain the position of the plate relative to the segment.

15. The adjustable mounting assembly of claim 11, wherein the frame member has a protrusion configured to couple to the fixed nut.

16. The adjustable mounting assembly of claim 15, wherein the frame member has an extension configured to couple to a fan deck of the HVAC unit.

17. The adjustable mounting assembly of claim 16, wherein the frame member has a support segment extending from the protrusion toward the extension.

18. The adjustable mounting assembly of claim 11, comprising a bolt configured to insert through the fixed nut, wherein the bolt is coupled to a base plate configured to support the fan motor in the space.

19. The adjustable mounting assembly of claim 18, wherein the bolt has markings configured to indicate a position of the bolt with respect to the fixed nut.

20. A heating, ventilation, and/or air conditioning (HVAC) unit, comprising:
   a fan deck having a fan orifice with a boundary configured to encircle a fan;
   a frame including a plurality of frame members and a fixed nut coupled to each frame member of the plurality of frame members to define a space configured to receive a fan motor of the fan, wherein each frame member of the plurality of frame members is configured to couple to the fan deck; and
   a bolt configured to extend through the fixed nut and into the space, wherein the bolt is configured to engage with the fan motor disposed in the space.

21. The HVAC unit of claim 20, comprising a plurality of plates, wherein each plate of the plurality of plates is configured to couple to a respective frame member of the plurality of frame members, and a respective position of each plate relative to the respective frame member is adjustable.

22. The HVAC unit of claim 21, wherein each plate of the plurality of plates is configured to abut the fan motor disposed in the space.

23. The HVAC unit of claim 20, wherein the fan deck includes a plurality of openings, and wherein each frame member of the plurality of frame members includes an extension configured to extend into a respective opening of the plurality of openings to couple the frame to the fan deck.

24. The HVAC unit of claim 20, wherein the bolt is adjustable relative to the fixed nut to adjust a position of the fan motor within the space and to adjust a position of fan within the fan orifice.

25. The HVAC unit of claim 20, wherein the fixed nut is configured to align with the fan, the fan orifice, and the fan motor concentrically.

* * * * *